April 29, 1930. W. N. GITTINGS 1,756,858
AUTOMATIC SWITCHING SYSTEM
Filed Aug. 10, 1928
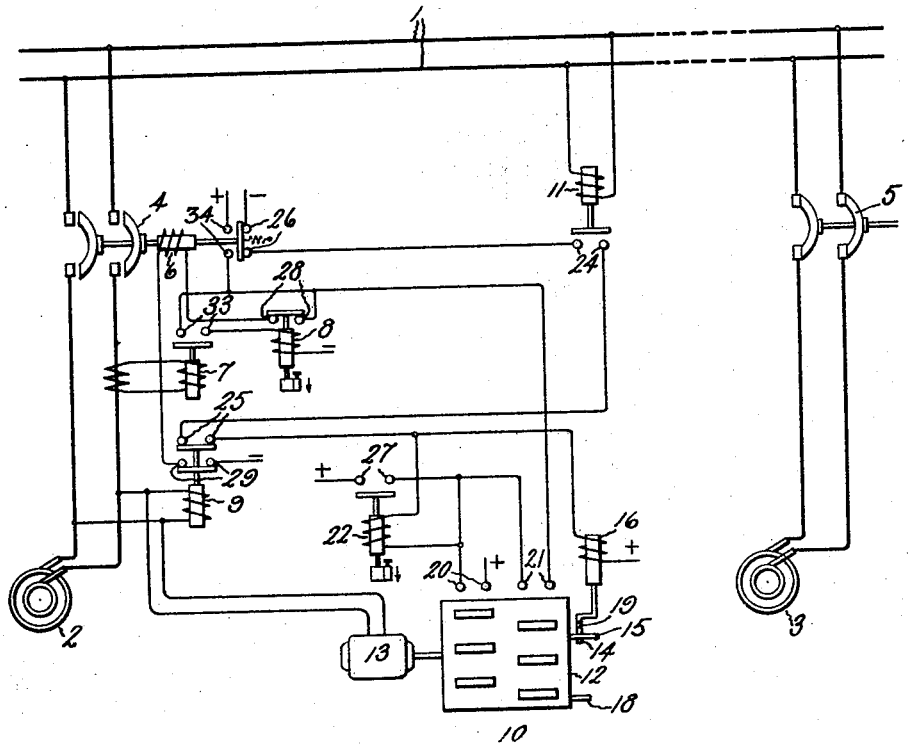
Inventor:
William N. Gittings,
by Charles E. Mullen
His Attorney.

Patented Apr. 29, 1930

1,756,858

UNITED STATES PATENT OFFICE

WILLIAM N. GITTINGS, OF SPRINGFIELD, PENNSYLVANIA, ASSIGNOR TO GENERAL ELECTRIC COMPANY, A CORPORATION OF NEW YORK

AUTOMATIC SWITCHING SYSTEM

Application filed August 10, 1928. Serial No. 298,694.

My invention relates to automatic switching systems and particularly to systems for controlling the connections between a plurality of sources of current and a load circuit so that when a source which is supplying current to the load circuit fails or is disconnected from the load circuit by an overload thereon a second source is automatically connected to the load circuit to restore the supply of current thereto. One object of my invention is to provide an improved arrangement of apparatus for accomplishing this result.

In certain systems of distribution such for example as a railway signaling system it is very important that any interruption in the supply of current to the load circuit be as short as possible. Therefore, it is customary to have two sources of current available, one of which is normally connected to the load circuit and the other of which is normally disconnected from the load circuit and is arranged to be connected thereto when the load circuit is deenergized due either to a failure of the first source or a disconnection thereof from the load circuit. When the interruption in the current supplied to the load circuit is due to the failure of the first source, the connection of the second source thereto immediately reenergizes the load circuit so that the supply of current thereto is restored. When, however, the disconnection of the first source is due to a fault on the load circuit and the fault is of a permanent character, the second source may also be disconnected immediately after it is connected to the load circuit. In order that the supply of current to the load circuit may not be permanently interrupted under such conditions, I provide an arrangement of apparatus whereby one of the sources is arranged to be connected to the load circuit a plurality of times within a predetermined time interval if the fault on the load circuit is not removed and the voltage thereof restored within said predetermined time interval.

My invention will be better understood from the following description taken in connection with the accompanying drawing and its scope will be pointed out in the appended claims.

Referring to the accompanying drawing which is a diagram showing a system of distribution embodying my invention, 1 represents a load circuit, such as a section of a railway signalling system, which is arranged to be supplied at different points by two suitable sources of current 2 and 3. The sources 2 and 3 are arranged to be connected to the load circuit 1 by switches 4 and 5 respectively which may be of any suitable type examples of which are well known in the art.

For controlling the opening and closing of each switch, any suitable switching arrangement may be provided which effects the opening of the switch when the associated source fails or is overloaded. In order to simplify the disclosure, however, I have shown in detail only the automatic switching arrangement for the switch 4 but it is to be understood that the switch 5 may be provided with a similar or any other suitable automatic switching arrangement.

As shown the automatic switching arrangement for the switch 4 comprises a closing coil 6 which when energized closes the switch and maintains it closed. In order to effect the opening of the switch 4 when it is closed and the source 2 is overloaded, I provide an overload responsive relay 7 which is connected to the source 2 in any suitable manner so that it is energized in accordance with the current output of the source. When the current output of the source 2 exceeds a predetermined amount the overload responsive relay 7 effects the energization of a control relay 8 associated therewith which in turn effects the deenergization of the closing coil 6 so that the switch 4 opens.

For effecting the opening of the switch 4 when the voltage of the source 2 fails I provide a voltage responsive relay 9 which is connected across the source 2 and which is arranged to effect the deenergization of the closing coil 6 when the voltage of the source 2 decreases below a predetermined value.

For controlling the automatic closing of the switch 4 so that it is closed only when the associated source 2 is energized and the load circuit 1 is deenergized I provide a timing device 10, well known in the art as a motor operated timer, which is arranged to be started only when the switch 4 is open, the load circuit 1 is deenergized and the source 2 is energized. The control of the timing device in accordance with the voltage of the source 2 is effected by the voltage relay 9 and the control thereof in accordance with the position of the switch 4 is affected by auxiliary contacts on the switch. In order to control the starting of the timing device in accordance with the load circuit voltage I provide a voltage relay 11 which is responsive to the load circuit voltage.

The particular timing device 10 shown in the drawing comprises a timer 12 and a direct connected driving motor 13 which is permanently connected across the source 2. The timer and motor are normally prevented from rotating by a stop 14 which engages a projection 15 on the timer. The stop 14 is arranged to be moved out of engagement with the projection 15 by means of a release magnet 16 which is energized when the conditions are such that it is desired to close the switch 4. The stop 14 is also arranged to engage another projection 18 on the timer when it has reached a predetermined position if the release magnet 16 is energized. This position is called the lockout position and when the timer is held in this position further operation of the timer is prevented. The stop 14 is provided with a groove 19 which is so spaced that the projection 18 is in this groove when the timer is held in its lockout position. Consequently, the subsequent deenergizations of the magnet 16 does not permit the stop 14 to move out of engagement with the projection 18. The stop 14 has to be operated manually in order to move it out of engagement with the projection 18.

The timer 12 is provided with two sets of contacts 20 and 21 which are arranged to be closed alternately by the timer a plurality of times with predetermined time intervals between successive closures of the same contacts. When the contacts 20 are closed a circuit is completed for a control relay 22 if the circuit conditions are such that it is desirable to have the switch 4 closed. The control relay 22 when energized completes a locking circuit for itself which is independent of the contacts 20 of the timer so that when the contacts 20 are subsequently opened the control relay 22 remains energized. When the contacts 21 of the timer are closed a circuit is completed for the closing coil 6 of the circuit breaker to close the switch 4, if the control relay 22 is energized.

The operation of the arrangement shown in the drawing is as follows:

It will be assumed that the switch 5 is closed so that the source 3 is supplying current to the load circuit 1 and that the switch 4 is open so that source 2 is disconnected from the load circuit. Under these conditions the voltage relay 11 associated with each source is energized so that the contacts 24 thereof are opened. Since these contacts 24 are in the energizing circuit of the release magnet 16 of the associated timing device 10 these release magnets are deenergized and therefore each timer is held against rotation by its associated stop 14.

It will now be assumed that the source 3 fails so that the voltage across the load circuit decreases below a predetermined value and the voltage relays 11 associated with the respective sources close contacts 24. The deenergization of the voltage relay 9 associated with the source 3 effects the deenergization of the closing coil of the switch 5 so that the switch opens and disconnects the source 3 from the load circuit 1.

The closing of the contacts 24 of the relay 11 associated with switch 4 completes an energizing circuit for the release magnet 16 from one side of the control circuit through the coil of the release magnet 16, contacts 25 of the voltage relay 9 associated with the source 2, contacts 24 of the voltage relay 11 and auxiliary contacts 26 on the switch 4. It will be observed that it is necessary for the voltage of the associated source 2 to be above a predetermined value, the associated switch 4 to be open, and the voltage of the load circuit 1 to be below a predetermined value in order to complete the starting circuit to start the timing device 10 into operation. Therefore since the source 3 is assumed to have failed, its associated voltage coil 9 is not energized and therefore the associated timing device 10 is not started under the condition assumed.

The energization of the release magnet 16 of the timer 12 associated with the switch 4 moves the stop 14 out of engagement with the projection 15 so that the motor 13 is free to rotate the timer. After a predetermined time interval the timer 12 closes its contacts 20 and completes a circuit for the control relay 22 across a suitable source of control current.

The circuit of the control relay 22 also includes the contacts 25 of the relay 9, the contacts 24 of the voltage relay 11 and the auxiliary contacts 26 on the switch 4 so that if the voltage of the source 2 is less than a predetermined value, or the voltage of the load circuit is restored to normal before the switch 4 is reclosed, or the switch 4 is not open, the timing device is rendered inoperative to effect the closing of the switch 4. The relay 22 by closing its contacts 27 completes a locking circuit for itself which is independent of the contacts 20 of the timer 12, so that the relay 22 is not deenergized by the subsequent opening of the timer contacts 20. When the timer 12 subsequently opens its contacts 20 and closes its contacts 21 a circuit is completed for the closing coil 6 of the switch 4 to close the switch. This circuit is from one side of the control circuit through contacts 27 of the control relay 22, contacts 21 of the timer 12, contacts 28 of the control relay 8, closing coil 6, contacts 29 of the voltage relay 9 to the other side of the control circuit. The closing of the switch 4 connects the source 2 to the load circuit 1 and if the load conditions on the load circuit are normal the switch 4 remains closed. The switch 4 by opening its auxiliary contact 26 effects the deenergization of the control relay 22 which in turn becomes deenergized and opens after a short time delay the above traced energizing circuit for the closing coil 6. The switch 4 by closing its contacts 34, however, completes a locking circuit for the closing coil 6 which is independent of the contacts 27 of control relay 22 so that the closing coil 6 is not deenergized by the opening of these contacts 27 after the switch 4 closes. The closing of the switch 4 restores the voltage of the load circuit to normal so that all of the voltage relays 11 are energized and their respective contacts 24 are open. Consequently, the release magnet 16 of the timing device 10 associated with the source 3 is not energized when the voltage of the source 3 is subsequently restored to normal.

After the switch 4 closes and remains closed the timer 12 associated with the switch 4 continues to rotate and close its contacts 20 and 21 successively but the closing of these contacts has no effect at this time as the circuit of the control relay 22 is open at the contacts 24 of relay 11 and the auxiliary contacts 26 on the switch 4. After the timer 12 has completed one revolution and again reaches its normal position it is stopped in that position by the projection 15 engaging the stop 14 since the release magnet 16 is deenergized.

When the voltage of the source 2 fails while it is supplying current to the load circuit, the voltage relay 9 associated therewith effects the opening of the switch 4 and the automatic switching arrangement associated with the source 3 operates if the source 3 is energized to effect the closing of the switch 5 in the same manner that automatic switching arrangement associated with the source 2 effects the connection thereof to the load circuit when the source 3 fails.

It will now be assumed that while the source 2 is supplying current to the load circuit 1, a fault occurs on the load circuit 1 so that the overload responsive relay 7 associated therewith closes its contacts 33 and completes a circuit for its control relay 8 through auxiliary contacts 34 on the switch 4. The control relay 8 by opening its contacts 28 effects the opening of the switch 4 so that source 2 is disconnected from the load circuit and the load circuit becomes deenergized. Consequently, both of the voltage relays 11 close their respective contacts 24 so that the timing means 10 associated with both of the sources 2 and 3 are started substantially simultaneously. Each timing device 10 effects in the manner described the closing of its respective switch. By varying the spacing and number of bridging contacts, the switches 4 and 5 may be reclosed under such conditions in any desired sequence and each switch may be reclosed any desired number of times before it is locked out.

If the fault is removed before either timer reaches its locked position the first switch to be closed, after the removal of the fault, remains closed so that the relays 11 maintain their contacts 24 open and both timers return to their normal positions. If, however, the fault is a permanent one the switches 4 and 5 are locked out against further reclosures. When each timer reaches the respective lockout position, its projection 18 enters the groove 19 in the respective stop 14, which is held in the paths of movement of the projection 18 when the respective release magnets 16 is energized, so that it is stopped against further rotation and further closing of the respective switch is prevented. The timers remain in their respective lockout positions until the respective release magnets are reset by hand or other suitable means.

Since the energization of the release magnets 16 depend upon the voltage of the load circuit and the position of the respective switch, each timing means is arranged to be rendered inoperative to reclose its respective switch if it is open and the load circuit voltage is below a predetermined value when the timing means reaches its lockout position.

While I have, in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of current, a load circuit, a switch for connecting said source to said circuit, means for closing said switch including a timing device which when operated is arranged to effect the closing of said switch after a predetermined time interval, a starting circuit for said timing device, and means responsive to the position of said switch and the voltages of said load circuit and of said source for controlling said starting circuit so that the operation of said timing device is initiated automatically only when the switch is open, the voltage of the source is above a predetermined value and the load circuit voltage is below a predetermined value.

2. In combination, an electric circuit, a source of current supplying current to said circuit at one point, a second source of current for supplying current to said circuit at a different point, a switch associated with each source for connecting it to said electric circuit, overload responsive means associated with each switch for controlling the opening thereof, and means for effecting a plurality of times the alternative closing of said switches when a fault exists on said electric circuit including separate timing means associated with each switch and arranged when operated to effect the closing of the associated switch a plurality of times with predetermined time intervals between successive closures, said timing means being arranged to effect when operated simultaneously the alternative closing of said switches, and means associated with each switch and responsive to the voltage of said load circuit for effecting the operation of the associated timing means when the load circuit voltage is less than a predetermined voltage and for controlling the operation of the associated switch so that the closing thereof by the timing means is effective only when the load circuit voltage is less than a predetermined voltage.

3. In combination, an electric circuit, a plurality of sources of current, a switch associated with each source for connecting it to said circuit, overload responsive means associated with each switch for controlling the opening thereof, and means for successively connecting said sources to said load circuit a predetermined number of times when a fault exists on said circuit including separate timing means associated with each switch and arranged when operated to effect the closing of the associated switch a plurality of times with predetermined time intervals between successive closures, said timing means being arranged to effect when operated simultaneously the successive closing of said switches, and means responsive to the load circuit voltage for effecting the operation of each timing means when the load circuit voltage is less than a predetermined voltage.

In witness whereof, I have hereunto set my hand this 3rd day of August, 1928.

WILLIAM N. GITTINGS.